United States Patent [19]

Yu

[11] Patent Number: 5,045,946
[45] Date of Patent: Sep. 3, 1991

[54] METHOD FOR MULTI-SCREEN OPERATION IN A PICTURE-IN-PICTURE SYSTEM

[75] Inventor: Jae-Chun Yu, Seoul, Rep. of Korea

[73] Assignee: SamSung Electronics Co., Ltd., Suwon, Rep. of Korea

[21] Appl. No.: 439,323

[22] Filed: Nov. 21, 1989

[30] Foreign Application Priority Data

Dec. 31, 1988 [KR] Rep. of Korea ................ 1988-18101

[51] Int. Cl.$^5$ ......................... H04N 5/50; H04N 5/45
[52] U.S. Cl. ................................. 358/191.1; 358/183
[58] Field of Search ...................... 358/183, 22, 192.1, 358/191.1; 455/151

[56] References Cited

U.S. PATENT DOCUMENTS

| | | | |
|---|---|---|---|
| 4,897,727 | 1/1990 | Richards | 358/191.1 X |
| 4,918,531 | 4/1990 | Johnson | 358/183 |
| 4,959,719 | 9/1990 | Strubbe et al. | 358/192.1 X |
| 4,959,720 | 9/1990 | Duffield et al. | 358/191.1 |
| 4,996,597 | 2/1991 | Duffield | 358/191.1 X |

Primary Examiner—James J. Groody
Assistant Examiner—Mark R. Powell
Attorney, Agent, or Firm—Robert E. Bushnell

[57] ABSTRACT

There is provided throughout this paper a method for performing multi-screen in a PIP (picture-in-picture) system having a luminance/color (Y/C) unit 14 for generating a main screen; a PIP unit 11 for generating a sub-screen; a microcomputer 10 for controlling the entire system; an input and output selector 12, 13 for selecting the image signals under the control of the microcomputer 10; a pre-amplifier 17 for providing the remote control signal in a properly amplified signal with the microcomputer 10; a first and second tuner 15, 16 for tuning desired channels; a on-screen-display (OSD) 18 for display a plurality of skip channel number thereonto; and a mixer 19 for mixing the PIP screen with the OSD screen to display on a same screen. The method allows a user to be able to configure a desired picture-in-picture screen with each designated screen number on the picture-in-picture screen by the use of a technique of the skip channel OSD.

5 Claims, 6 Drawing Sheets

METHOD FOR MULTI-SCREEN OPERATION IN A PICTURE-IN-PICTURE SYSTEM

BACKGROUND OF THE INVENTION

This invention generally relates to a multi-screen video cassette recorder (hereinafter referred to as VCR) and television set, and especially to a method for performing a screen processing onto a given number of subscreens each, in a picture-in-picture (PIP) system.

In general, a known PIP system displays a certain picture as a main screen and a given number of sub-screens, which have the same image source with one another, are arranged at predetermined positions on the main screen by pressing a PIP key. Meanwhile, with pressing a PLAY key the image from the video tape of the VCR will replace the existing main screen, whilst the sub-screens keep on displaying the present pictures. However, in this circumstance, if channel UP/DOWN key is inputted to change the present screen display at a user's desire, then the all sub-screens will be displayed with the same pictures changed whilst, of course, the main screen keeps the existing picture of the VCR. Accordingly, there is a disadvantage that the PIP system displays the sub-screens with the same pictures, which can not provide the user with a various PIP screen.

SUMMARY OF THE INVENTION

Therefore, an object of the present invention is to provide a method of multi-screen operation whereby a user is able to configure a desired picture-in-picture screen with each designated screen number on the picture-in-picture screen by using a technique of a skip channel on-screen-display (OSD).

According to an aspect of the invention to achieve the above object, there is provided a method for configuring the PIP screen, said method including the steps of:
(a) outputting rotation data to stop a strobing function if a SCREEN PROGRAM key is pressed;
(b) calling a skip channel OSD in the above strobe-stop condition to check if the channel UP/DOWN key is pressed, increasing pointer value if it is pressed, and selecting the currently flickering channel to output the rotation data, if it is not pressed but the ROTATE key is pressed; and
(c) clearing the skip channel OSD if the ROTATE key is not pressed, but the SCREEN key is pressed, and outputting the strobe data and setting a screen mode for zero to release the strobe-stop condition.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENTS

An embodiment of the invention will now be described hereinbelow in detail, with reference to the accompanying drawing.

Figure 1:
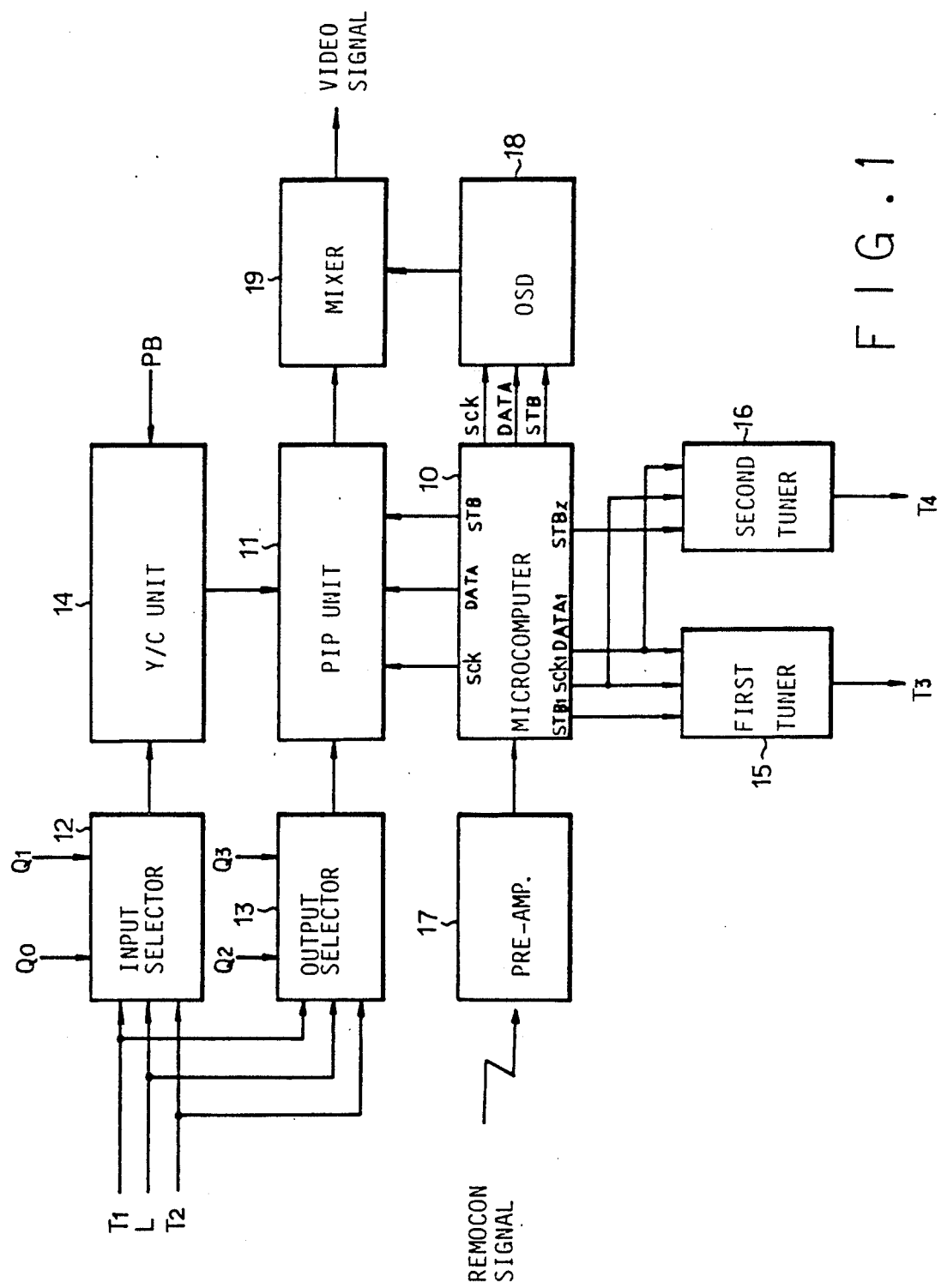
FIG. 1 shows a block diagram according to the invention.

Referring now to FIG. 1, the signal from a remote controller (not shown) is amplified by a pre-amplifier 17 and applied to a microcomputer 10. The microcomputer 10 decodes the signal applied to determine what type of key input has bee pressed. A first and second tuners 15, 16 are used to perform the picture-in-picture operation which makes it possible to configure the multi-screen freely at user's desire. The selection of the first or the second tuner 15, 16 is controlled by the first and second strobe terminals $STB_1$ and $STB_2$ of the microcomputer 10. The data output from the data terminal $DATA_1$ of the microcomputer 10 affects the channel to be selected.

The output terminals $T_3$, $T_4$ of the first and second tuners 15, 16 are connected to the input terminals $T_1$, $T_2$ of an input and output selectors 12, 13, respectively. A line L connected to both the input and the output selector 12, 13 is used to connect external equipment to the VCR. Each of the input and output selectors 12, 13 is controlled by a given data $Q_0$, $Q_1$ and $Q_2$, $Q_3$ generated from the microcomputer 10 to select one of the signals applied from the input terminals T1, T2 and the line L. The input selector 12 is used to select the main screen, while the output selector 13 is used to select the sub-screen.

The signals selected by the input and output selectors 12, 13 are applied to a luminance/color (Y/C) unit 14 and a picture-in-picture (PIP) unit 11, respectively. The Y/C unit 14 is used to create the main screen. The signals selected by the input selector 12 will be the main screen source if playback (PB) key is inputted, and, however, the screen for the tape will be the main screen source if the playback key is no inputted.

The main screen and the sub-screen selected by the input and output selectors 12, 13 are applied to the PIP unit 11. The PIP screen generated under the control of a clock SCK, data DATA, and strobe STB terminals of the microcomputer 10 is applied into a mixer 19. An on-screen-Display (OSD) 18 displays some characters under the control of the clock SCK, data DATA and strobe STB terminals of the microcomputer 10. The character data is sent out to the mixer 19 to be superimposed upon the screen. The mixer 19 superimposes the characters upon the screen with the video signal output.

The PIP unit 11 is controlled by exchanging the data in series with the microcomputer 10. As is shown in Table 1 hereinbelow, if the microcomputer 10 outputs the data (0000 0010), the PIP unit 11 performs the rotation function.

TABLE 1

| DATA | FUNCTION |
| --- | --- |
| 0000 0010 | rotation |
| 0010 1111 | strobe |
| . | . |
| . | . |
| . | . |

Pressing the ROTATE key (for example, in a 4-PIP system), the model used for the invention will stop strobing. To achieve the strobe-stop condition, the strobe data should be outputted in series to the PIP unit 11 from the microcomputer 10. To configure the PIP screen, it is required to press the SCREEN PROGRAM key or a corresponding key under the condition of FIG. 2A or under normal conditions.

Figure 2A:
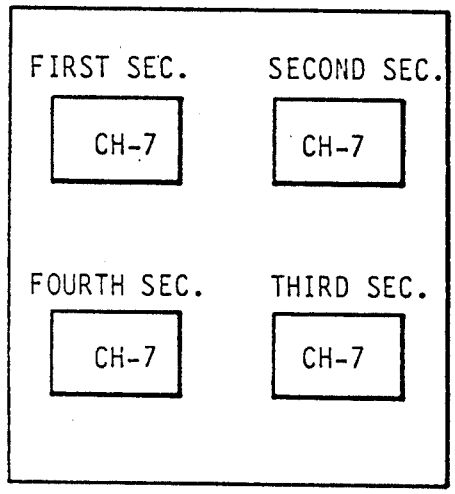
FIGS. 2A-2H show the screen status diagram according to the invention.
Figure 2B:
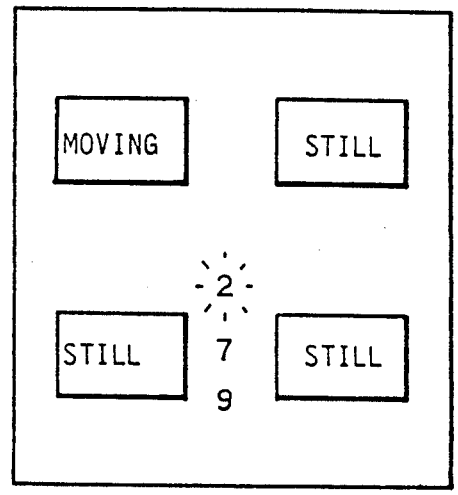

Then the strobing will be stopped and, as shown in FIG. 2B, the skip channel is displayed by the OSD 18 while flickering the upper-most channel number. The strobing is to transfer the position of the moving screen in a given direction, rotationally. Only one of the four sub-screens is of the moving screen, while the others remain in still screens. The strobe-stop state is the state where the system remains in one of the strobing state, i.e., any one of the four sub-screens is a moving screen and the others are still screens. In addition, the skip channel represents the available channel for actual broadcasting. A memory which stores the channel number is called a skip memory.

Figure 2C:
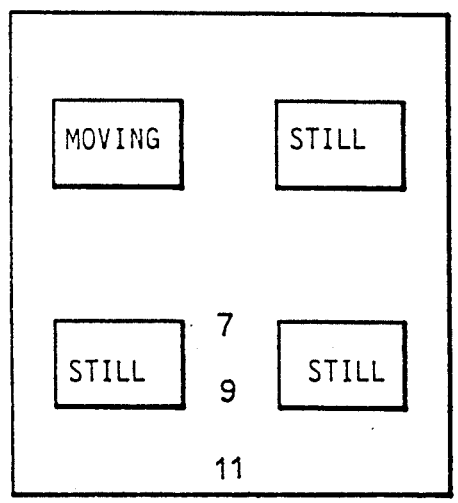

Then, the upper-most channel number flickers by the strobe-stop state and, thereafter, pressing the channel UP/DOWN key changes the channel number flickering. Pressing the channel UP/DOWN key for lower channel when the lower-most channel 9 is flickering, channel 2 will disappear as, shown in FIG. 2C, and channel 11, the next channel in the skip memory, will be displayed.

Figure 2D:
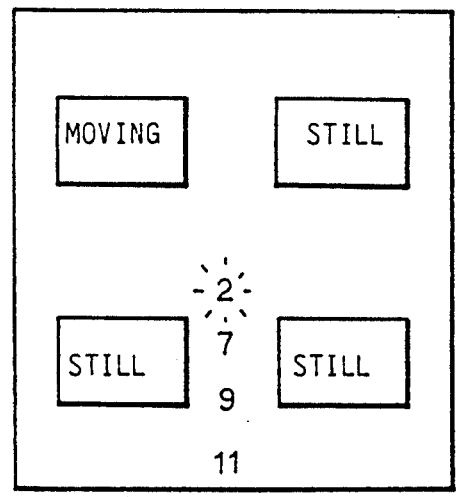
Figure 2E:
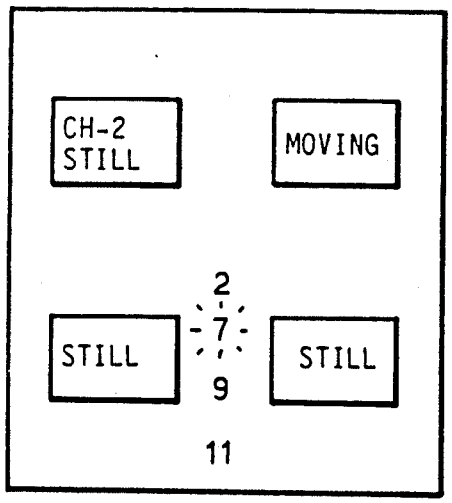
Figure 2F:
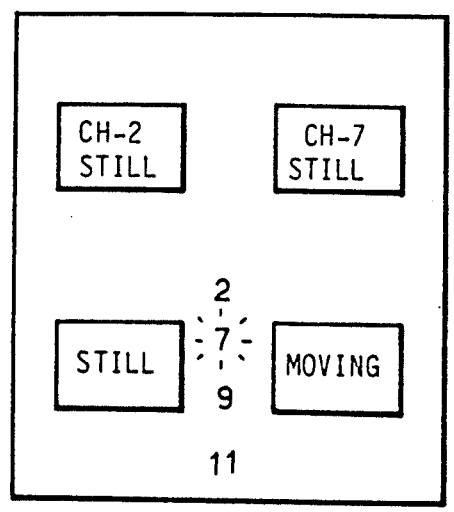
Figure 2G:
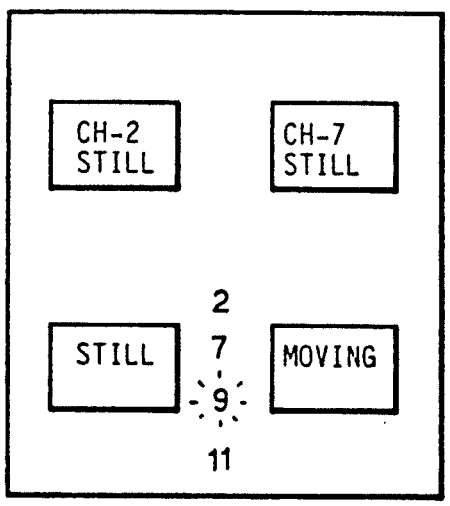
Figure 2H:
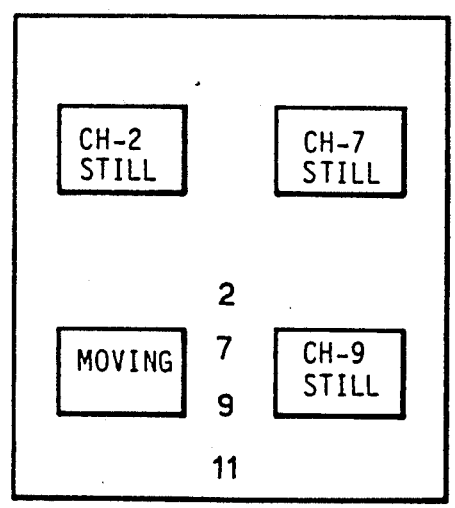

Following is the description of how a screen comprised of four channel-7 screens is changed to one comprised of channels 2, 7, 9, and 11. Under the condition as shown in FIG. 2A, pressing the SCREEN PROGRAM key results in the condition shown in FIG. 2D. By pressing the ROTATE key, the moving screen currently at a first section is changed to the flickering channel 2 and is transferred to a second section. As shown in FIG. 2E, the first section is configured with the channel 2. In order to configure the second section with the channel 7, executing the rotation, or pressing the ROTATE key after making the channel 7 flickering by using the channel UP/DOWN key for a lower channel as shown in FIG. 2E, results in the configuration of FIG. 2F. Configuring a third section with the channel 9 and the fourth section with the channel 11 are conformed in the same way as the configuration procedures for the first and second sections. The resulting screens are depicted in FIGS. 2H and 2G respectively.

Pressing the PROGRAM key to leave the screen program mode releases the strobe-stop. Then, the channels configured by the user will be displayed and the OSD display for the skip channel will disappear.

Figure 3:
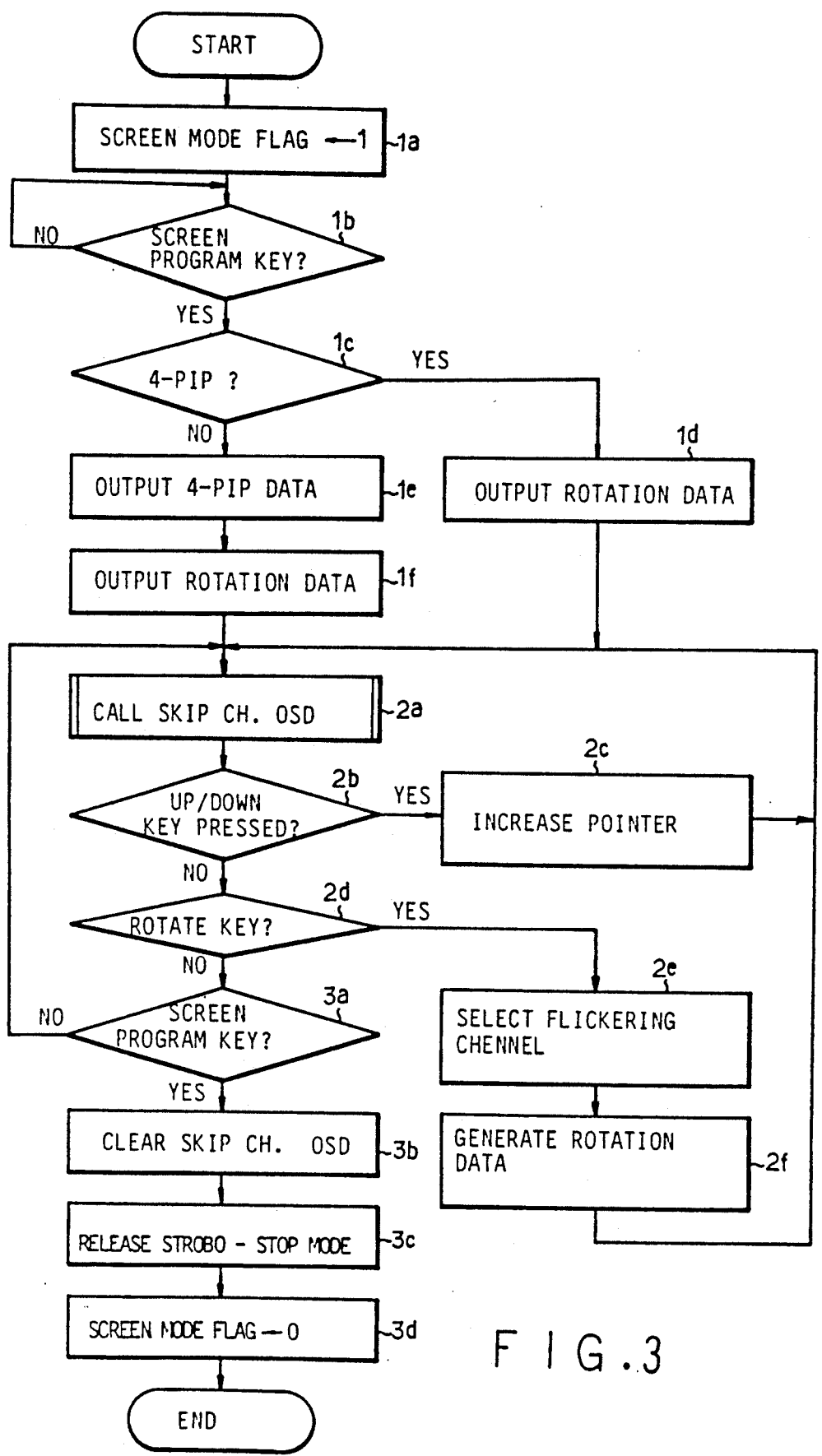
FIG. 3 shows a flow chart illustrating the overall operation of the invention.

The screen program function will now be described by referring to the flow diagram in FIG. 3. At step 1a, "1" is assigned to the screen mode flag and at step 1b, the microcomputer 10 checks whether the SCREEN PROGRAM key is pressed. If it is pressed, the strobing will be stopped and step 1c will be executed. Otherwise, the step 1b will be repeated.

At the step 1c, the microcomputer 10 checks if it is the 4-PIP screen mode or not. If it is the 4-PIP screen mode, step 1d will be executed. Otherwise, step 1e will be executed. At the step 1d, the rotation data will be output and step 2a will be executed. The 4-PIP data will be output at the step 1e and the rotation data will be output at step 1f then the step 2a will be executed. The step 2a calls the skip channel OSD and a step 2b checks whether the channel UP/DOWN key is pressed. If it is pressed, the skip memory pointer value will be increased by a designated value and the step 2a will be performed again. If it is not pressed, whether the ROTATE key is pressed will be checked at step 2d. If the ROTATE key is pressed, step 2e will be executed or, otherwise, a step 3a will be executed. The channel which is flickering on the skip channel OSD 18 is selected at the step 2e and then step 2f will be performed. At the step 2f, the rotation data is generated and the step 2a is executed again.

At the step 3a, whether the SCREEN PROGRAM key is pressed will be checked. If it is not pressed, the step 2a will be executed again. Otherwise, it clears the skip channel OSD 18 at step 3b and executes step 3c. The strobe-stop condition that outputs the strobing data will be released at the step 3c and then step 3d will be executed. At the step 3d, the screen mode will be set to "0" to complete the procedure.

Figure 4:
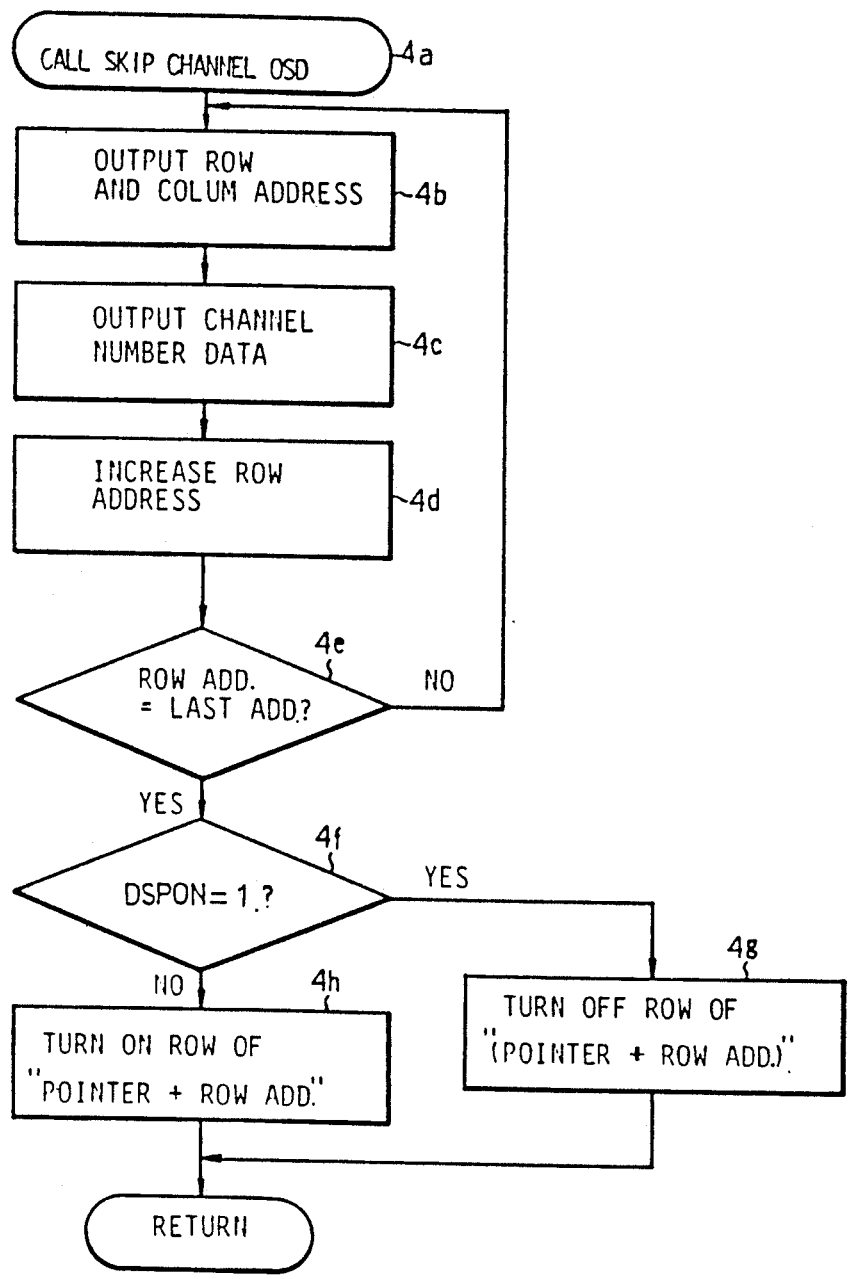
FIG. 4 shows a flow chart for displaying channel status according to the invention.

FIG. 4 shows a flow diagram for indicating the channel on the screen, wherein the following steps will be executed with calling the skip channel OSD 18 at the step 2a. The skip channel OSD 18 will be called and the data for row address and column address will be output at step 4b and then step 4c will be performed. The step 4c outputs the channel number data stored in the skip memory and step 4d increases the row address. Then step 4e will be executed. At the step 4e, whether the row address is same with a last address. If it is not same with the last address, the step 4b will be executed again. If it is the last address, step 4f will be executed. The step 4f checks whether display-on flag DSPON is set to "1". If it is not "1", step 4h will be executed. If it is "1" step, 4g will be performed.

At the step 4g, the line corresponding to the pointer value which is added with the row address will be turned off to return. At the step 4h, the line corresponding to the pointer value plus the row address will be turned on to return to the main step.

Figure 5:
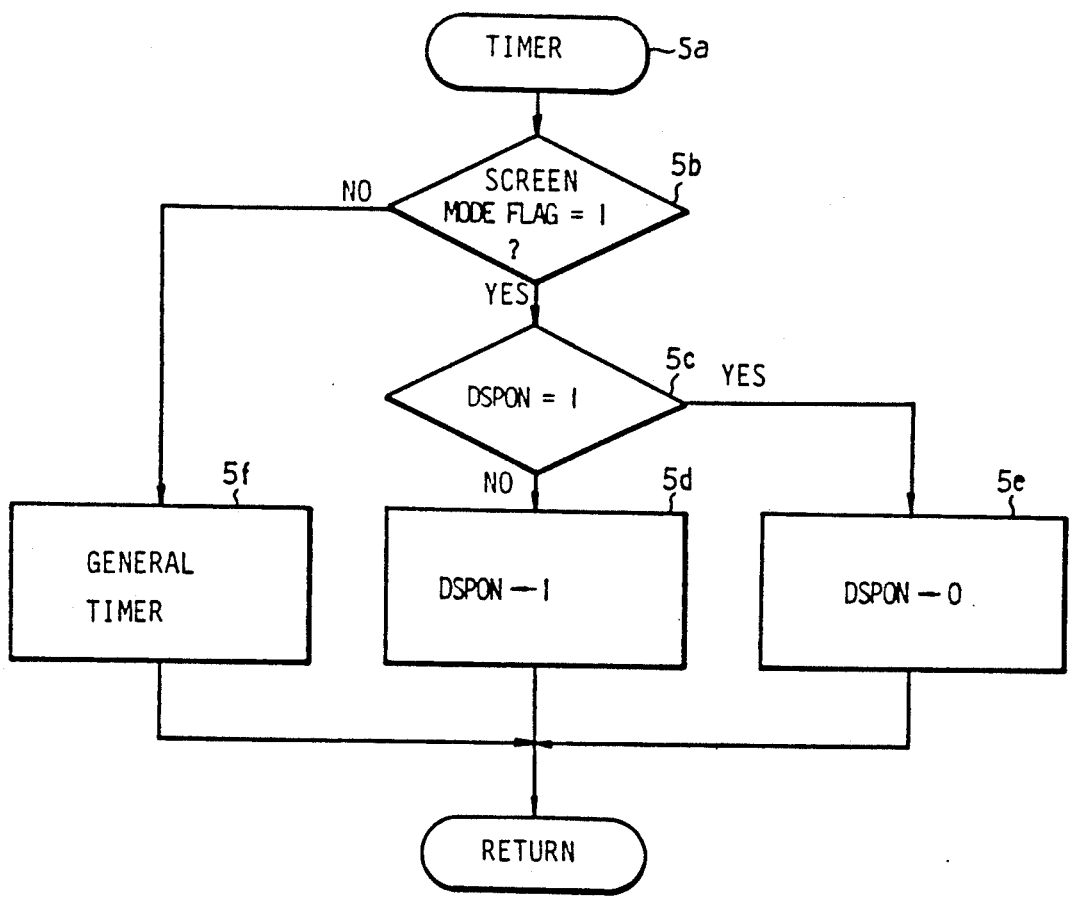
FIG. 5 shows a flow chart for flickering a skip channel on-screen-display (OSD) according to the invention.

FIG. 5 shows a flow diagram to show the time for the skip channel flickering interval. Step 5b checks whether the screen mode is "1" or not. If it is "1", step 5c will be executed. If not "1", step 5f will be performed. The step 5c checks whether the display-on flag DSPON is set to "1" or not. If it is not "1", the display-on flag DSPON is set to "1" at step 5d and then returns. If it is "1", the display-on flag DSPON is set to "0" at step 5e and then returns. At the step 5f, the general timer operates for a predetermined period and then returns.

As described above, for each designated screen channel memorized on the PIP screen, the user directly configures the desired PIP screen using the skip channel OSD. Therefore, the invention is advantageous in providing the user with various PIP screens and improving the quality of the system.

While the invention has been particularly shown and described with reference to a preferred embodiment, it will be understood by those skilled in the art that modifications in detail may be made without departing from the spirit and scope of the invention.

All of the features disclosed in this specification (including any accompanying claims, abstract and drawings), and/or all of the steps of any method or process so disclosed, may be combined in any combination, except combinations where at least some of such features and/or steps are mutually exclusive.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method for performing a multi-screen in a picture-in-picture system, said method comprising the steps of:

(a) outputting a rotation data from a microcomputer to perform a strobe-stop, if a screen program key is pressed;

(b) judging whether a channel up/down key is pressed by calling a skip channel on-screen-display of the strobe-step condition, increasing a pointer value if said channel up/down key is pressed, selecting a channel presently flickering if said key is not pressed but a rotate key is pressed, and thereby outputting the rotation data; and (c) clearing said skip channel on-screen-display if the screen program key is pressed while the rotate key is not pressed at the step (b) and outputting a strobe data to release the strobe-stop condition.

2. The method according to claim 1, wherein said calling step for the skip channel on-screen-display comprises the steps of:

(i) outputting a row and column address data and a channel number data stored in a skip memory if the skip channel on-screen-display is called, and checking whether said row address is same with a last address; and (ii) checking whether a display-on flag is set to "one" if said row address in the first step is same with the last address, turning off a channel number on a row corresponding to a value of adding the pointer and the row address if said display is on-state, or otherwise turning on the channel number on said row address corresponding to the value of adding the pointer and the row address.

3. The method according to claim 2, wherein said step (a) comprises the steps of:

(1) setting a screen mode flag to "one", judging whether a screen program key is pressed, and judging repeatedly whether said screen program key is pressed until said screen program key is detected;

(2) judging whether a four picture-in-picture mode is set when the screen program key is pressed at the step (1), and outputting the rotation data to perform the strobe-stop mode if the four picture-in-picture mode is set; and (3) outputting a corresponding four picture-in-picture data if the four picture-in-picture mode is not set at the step (2), and thereby outputting the rotation data to perform the strobe-stop mode.

4. The method according to claim 3, wherein said step (b) comprises the steps of:

a calling the skip channel on-screen-display at the strobe-stop mode and judging whether the channel up/down key is pressed;

b increasing the pointer value if the channel up/down key is pressed at the step a and re-calling the skip channel on-screen-display; and c judging whether the rotate key is pressed if the channel up/down key is not pressed at the step a, selecting a corresponding channel which is presently flickering if the rotate key is pressed, thereby outputting the rotation data, and then re-calling the skip channel on-screen-display.

5. The method according to claim 4, wherein said step (c) comprises:

a first step for judging whether the screen program key is pressed if the rotate key is not pressed, and re-executing said step (b) if the screen program key is not pressed;

a second step for clearing the skip channel on-screen-display if the screen program key is pressed at the first step; and a third step for outputting the strobe data to release the strobe-stop mode and setting the screen mode to "zero".

* * * * *

UNITED STATES PATENT AND TRADEMARK OFFICE
CERTIFICATE OF CORRECTION

PATENT NO. : 5,045,946

DATED : 3 September 1991

INVENTOR(S) : Jae-Chun YU

It is certified that error appears in the above-identified patent and that said Letters Patent is hereby corrected as shown below:

ON THE TITLE PAGE

<u>IN THE ABSTRACT</u>

Line 11,   replace "a" with --an--;

Line 12,   replace "display" with --displaying--, and replace "number" with --numbers--;

Line 18,   delete "technique of the", and insert --technique-- after "OSD".

Column 1,   Line 13,   replace "have" with --all share--;

Line 15,   replace "with" with --by--;

Line 19,   insert --a-- after "if";

Line 20,   replace "at a" with --according to the--;

Line 21,   delete "the", and insert --of the-- after "all";

Line 24,   replace "Accordingly, there" with --Consequently, it--;

Line 26,   replace "can" with --does--;

Line 35,   delete "technique of a";

Line 36,   insert --technique-- after "(OSD)";

UNITED STATES PATENT AND TRADEMARK OFFICE
CERTIFICATE OF CORRECTION

PATENT NO. : 5,045,946

DATED : 3 September 1991

INVENTOR(S) : Jae-Chun YU

It is certified that error appears in the above-identified patent and that said Letters Patent is hereby corrected as shown below:

Column 1, Line 39, delete "said method";

Line 43, replace "if" with --whether--;

Line 54, insert --present-- before "invention";

Line 57, replace "in which" with --wherein--;

Column 2, Line 2, replace "EMBODIMENTS" with --EMBODIMENT--;

Line 10, replace "signal applied" with --applied signal--;

Line 11, replace "A first" with --First--;

Line 14, replace "at" with --according to the--;

Line 37, insert --a-- after "if", and replace the comma with a semicolon;

Line 38, delete "and,";

Line 45, replace "Display" with --display--;

UNITED STATES PATENT AND TRADEMARK OFFICE
CERTIFICATE OF CORRECTION

PATENT NO. : 5,045,946

DATED : 3 September 1991

INVENTOR(S) : Jae-Chun YU

It is certified that error appears in the above-identified patent and that said Letters Patent is hereby corrected as shown below:

Column 3, Line 63, replace "step"(first occurrence) with --Step--, and delete "a" (second occurrence);

Line 66, delete "the";

Line 67, replace "it" with --the channel UP/DOWN key--, and insert --step 2d checks-- before "whether";

Line 68, delete "will be checked at step 2d";

Column 4, Line 4, delete "the";

Line 5, delete "the" (third occurrence);

Line 7, delete "the" (first occurrence);

Line 8, delete "the";

Line 9, delete "it clears";

Line 10, insert --is cleared-- after "18";

Line 12, Delete "the";

Line 13, delete "the" (first occurrence);

Line 17, delete "the" (second occurrence);

UNITED STATES PATENT AND TRADEMARK OFFICE
CERTIFICATE OF CORRECTION

PATENT NO. : 5,045,946

DATED : 3 September 1991

INVENTOR(S) : Jae-Chun YU

It is certified that error appears in the above-identified patent and that said Letters Patent is hereby corrected as shown below:

| | | |
|---|---|---|
| Column 3, | Line 2, | replace "required" with --necessary--; |
| | Line 5, | replace "Then" with --Consequently,--; |
| | Line 8, | replace "is to transfer" with --transfers--; |
| | Line 12, | replace "where" with --in which--, and replace "state" with --states--; |
| | Line 20, | insert --flickering-- before "channel", and delete "flickering" after "number"; |
| | Line 21, | insert --a-- after "for"; |
| | Line 23, | delete the comma (first occurrence); |
| | Line 27, | replace "one" with --a screen--; |
| | Line 37, | replace "flickering" with --flicker--; |
| | Line 56, | delete "the" (first occurrence), and replace "if" with --whether--, and insert --in-- after "is"; |
| | Line 57, | insert --in-- after "is"; |
| | Line 59, | delete "the" (first occurrence); |
| | Line 62, | insert --and-- before "then", and delete "The". |

UNITED STATES PATENT AND TRADEMARK OFFICE
CERTIFICATE OF CORRECTION

PATENT NO. : 5,045,946

DATED : 3 September 1991

INVENTOR(S) : Jae-Chun YU

It is certified that error appears in the above-identified patent and that said Letters Patent is hereby corrected as shown below:

Column 4, Line 19, replace "output" with --outputted--;

Line 23, replace "At the step" with --Step--, and insert --checks-- before "whether";

Line 25, delete "the" (second occurrence);

Line 26, replace "The step" with --Step--;

Line 30, delete "the" (first occurrence);

Line 32, delete "the" (first occurrence);

Line 35, insert --needed-- after "time";

Line 38, replace "The step" with --Step--;

Line 43, delete "the" (first occurrence);

Line 57, replace "any" with --all--;

Column 5, Claim 1, Line 5, delete "a" (first occurrence);

Line 17, delete "a" (both occurrences);

UNITED STATES PATENT AND TRADEMARK OFFICE
CERTIFICATE OF CORRECTION

PATENT NO. : 5,045,946

DATED : 3 September 1991

INVENTOR(S) : Jae-Chun YU

It is certified that error appears in the above-identified patent and that said Letters Patent is hereby corrected as shown below:

Column 5, Claim 2, Line 22, delete "a" (both occurrences);

Line 25, insert --the-- before "same", and replace "with" with --as--;

Line 27, replace "one" with --1--;

Line 28, replace "same" with --the same as--;

Claim 3, Line 37, replace "one" with --1--;

Column 6, Claim 3, Line 4, delete "the" (second occurrence);

Line 10, delete "the" (first occurrence);

Claim 4, Line 14, replace "a" with --(a')--;

Line 17, replace "b" with --(b')--;

Line 18, delete "the", and replace "a" with --(a')--;

Line 20, replace "c" with --(c')--;

Line 21, delete "the", and replace "a" with --(a')--.

UNITED STATES PATENT AND TRADEMARK OFFICE
CERTIFICATE OF CORRECTION

PATENT NO.  : 5,045,946

DATED       : 3 September 1991

INVENTOR(S) : Jae-Chun YU

It is certified that error appears in the above-identified patent and that said Letters Patent is hereby corrected as shown below:

Claim 4, Line 21, delete "the", and replace "a" with --(a')--.

Signed and Sealed this

Seventeenth Day of March, 1992

*Attest:*

HARRY F. MANBECK, JR.

*Attesting Officer*          *Commissioner of Patents and Trademarks*